(12) United States Patent
Colson

(10) Patent No.: US 11,703,283 B2
(45) Date of Patent: Jul. 18, 2023

(54) RADIAL CONFIGURATION FOR HEAT EXCHANGER CORE

(71) Applicant: Hamilton Sundstrand Corporation, Charlotte, NC (US)

(72) Inventor: Paul M. Colson, Westfield, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 309 days.

(21) Appl. No.: 16/752,043

(22) Filed: Jan. 24, 2020

(65) Prior Publication Data

US 2021/0231378 A1    Jul. 29, 2021

(51) Int. Cl.
| F28D 7/10 | (2006.01) |
| F28D 7/02 | (2006.01) |
| F28F 1/36 | (2006.01) |
| B33Y 80/00 | (2015.01) |

(52) U.S. Cl.
CPC ............. *F28D 7/022* (2013.01); *F28D 7/106* (2013.01); *F28F 1/36* (2013.01); *B33Y 80/00* (2014.12)

(58) Field of Classification Search
CPC ..... F28D 7/106; F28F 1/06; F28F 1/08; F28F 7/02; F28F 1/36; B33Y 80/00
See application file for complete search history.

(56) References Cited

U.S. PATENT DOCUMENTS

| 1,525,094 | A | 2/1925 | Jones |
| 2,185,928 | A | 1/1940 | Simpson et al. |
| 2,479,071 | A | 8/1949 | George |
| 2,670,933 | A | 3/1954 | Bay |
| 2,809,019 | A | 10/1957 | Newton |
| 2,995,344 | A | 8/1961 | Waldemar |
| 3,033,534 | A | 5/1962 | Caughill et al. |
| 3,064,947 | A | 11/1962 | Wynne |
| 3,118,498 | A | 1/1964 | Bergdoll et al. |
| 3,255,818 | A | 6/1966 | Beam et al. |
| 3,335,790 | A | 8/1967 | Arpad et al. |

(Continued)

FOREIGN PATENT DOCUMENTS

| CN | 110201499 A | 9/2019 |
| DE | 4033537 A1 | 6/1991 |

(Continued)

OTHER PUBLICATIONS

Extended European Search Report for EP Application No. 20206391.3, dated Apr. 30, 2021, 8 pages.

(Continued)

*Primary Examiner* — Eric S Ruppert
(74) *Attorney, Agent, or Firm* — Kinney & Lange, P.A.

(57) ABSTRACT

A heat exchanger includes a first set of fins, a second set of fins, and an exterior wall. The first set of fins extend radially and are coaxial with each other. The first set of fins forms a first set of channels. The second set of fins extend radially and are coaxial with each other. The second set of fins forms a second set of channels. Channels of the first and second sets of channels are disposed in an alternating pattern in a circumferential direction of the heat exchanger. The first and second sets of fins are integrally formed together. A cross-sectional width of a channel of at least one of the first set of channels and the second set of channels increases as a radial distance from a centerline axis of the heat exchanger increases.

14 Claims, 9 Drawing Sheets

(56) References Cited

U.S. PATENT DOCUMENTS

| | | | |
|---|---|---|---|
| 3,633,663 A | 1/1972 | Tafel | |
| 3,656,543 A | 4/1972 | Wolowodiuk et al. | |
| 3,696,863 A | 10/1972 | Kim | |
| 3,827,484 A | 8/1974 | Wolowodiuk | |
| 4,893,672 A | 1/1990 | Bader | |
| 5,078,209 A | 1/1992 | Kerkman et al. | |
| 5,088,192 A | 2/1992 | Dempsey | |
| 5,107,919 A * | 4/1992 | Basseen | F28D 7/0066 165/47 |
| 5,172,752 A | 12/1992 | Goetz | |
| 5,314,009 A | 5/1994 | Kates et al. | |
| 7,003,970 B2 | 2/2006 | Iida et al. | |
| 7,377,098 B2 | 5/2008 | Walker et al. | |
| 8,961,114 B2 | 2/2015 | Ruthemeyer | |
| 9,200,855 B2 | 12/2015 | Kington et al. | |
| 9,459,052 B2 | 10/2016 | Kinder et al. | |
| 9,702,630 B2 | 7/2017 | Whaites et al. | |
| 9,764,435 B2 | 9/2017 | Morris et al. | |
| 9,766,019 B2 | 9/2017 | Eleftheriou et al. | |
| 9,840,927 B2 | 12/2017 | Tucker | |
| 9,851,159 B2 | 12/2017 | Cameron | |
| 10,107,555 B1 | 10/2018 | Miller | |
| 10,175,003 B2 | 1/2019 | Sennoun et al. | |
| 10,222,142 B2 | 3/2019 | Alvarez et al. | |
| 10,358,976 B2 | 7/2019 | Jagtap | |
| 10,376,932 B2 | 8/2019 | Williamson et al. | |
| 10,443,959 B2 | 10/2019 | Steeter et al. | |
| 2004/0055738 A1 | 3/2004 | Kauppila et al. | |
| 2004/0108104 A1 | 6/2004 | Luo | |
| 2005/0252636 A1 | 11/2005 | Kauppila et al. | |
| 2006/0032612 A1 | 2/2006 | Craig et al. | |
| 2007/0023163 A1 | 2/2007 | Kidwell et al. | |
| 2009/0056919 A1 * | 3/2009 | Hoffman | F28F 1/40 165/164 |
| 2010/0018673 A1 | 1/2010 | Yang | |
| 2010/0096115 A1 | 4/2010 | Erickson | |
| 2010/0116466 A1 | 5/2010 | Hawranek | |
| 2010/0193168 A1 | 8/2010 | Johnson | |
| 2011/0168369 A1 | 7/2011 | Kim et al. | |
| 2012/0199326 A1 | 8/2012 | Sheldon et al. | |
| 2013/0071594 A1 | 3/2013 | Bikson et al. | |
| 2013/0075067 A1 | 3/2013 | Heise et al. | |
| 2013/0277959 A1 | 10/2013 | Barthel et al. | |
| 2014/0054008 A1 | 2/2014 | Park | |
| 2014/0138067 A1 | 5/2014 | Yamashita et al. | |
| 2014/0182828 A1 | 7/2014 | Lekhin | |
| 2016/0230595 A1 | 8/2016 | Wong et al. | |
| 2016/0231068 A1 | 8/2016 | Schmitz et al. | |
| 2017/0010046 A1 | 1/2017 | Hofbauer | |
| 2017/0115072 A1 | 4/2017 | Machalek et al. | |
| 2017/0198990 A1 * | 7/2017 | Turney | F28F 1/025 |
| 2017/0232670 A1 | 8/2017 | Joerger et al. | |
| 2017/0292791 A1 | 10/2017 | Zaffetti et al. | |
| 2018/0345353 A1 | 12/2018 | Martin et al. | |
| 2019/0186361 A1 | 6/2019 | Gerstler et al. | |
| 2019/0204012 A1 | 7/2019 | Army et al. | |
| 2019/0210107 A1 | 7/2019 | Palmer | |
| 2019/0264993 A1 | 8/2019 | Tajiri et al. | |
| 2019/0285363 A1 | 9/2019 | Ruiz et al. | |
| 2020/0191488 A1 | 6/2020 | Gajendra | |

FOREIGN PATENT DOCUMENTS

| | | | | |
|---|---|---|---|---|
| DE | 19809859 A1 | | 9/1999 | |
| EP | 2886448 A1 | | 6/2015 | |
| EP | 3193125 A1 | | 7/2017 | |
| EP | 3320288 A1 | | 5/2018 | |
| EP | 3346220 A1 | | 7/2018 | |
| EP | 3431911 A1 | | 1/2019 | |
| EP | 3486595 A1 | | 5/2019 | |
| GB | 2573131 A | | 10/2019 | |
| JP | 2002013882 A | * | 1/2002 | F28D 7/106 |
| JP | 2008232449 A | * | 10/2008 | F28D 7/106 |
| WO | 2006064202 A1 | | 6/2006 | |
| WO | WO2016114673 A1 | | 7/2016 | |
| WO | WO2017008108 A1 | | 1/2017 | |
| WO | WO2017196952 A1 | | 11/2017 | |
| WO | WO2018182808 A1 | | 10/2018 | |
| WO | WO2019023703 A1 | | 1/2019 | |

OTHER PUBLICATIONS

Extended European Search Report for EP Application No. 21152399.8, dated Jun. 29, 2021, 5 pages.

Extended European Search Report for EP Application No. 21153193.4, dated Jun. 25, 2021, 6 pages.

Extended European Search Report for EP Application No. 21153197.5, dated Jun. 28, 2021, 7 pages.

* cited by examiner

RADIAL CONFIGURATION FOR HEAT EXCHANGER CORE

BACKGROUND

The present disclosure relates to heat exchangers. More particularly, the present disclosure relates to an additively manufactured heat exchanger.

The practical limitations of traditional manufacturing methods create limited geometry, shape, and arrangement of internal features in components such as heat exchangers. These limitations can constrain thermal energy transfer and fluid flow performance in the heat exchanger. Moreover, the ability to handle high pressures, temperatures, and their associated transient conditions can be diminished as well.

SUMMARY

A heat exchanger includes a first set of fins, a second set of fins, and an exterior wall. The first set of fins extend radially and are coaxial with each other. The first set of fins forms a first set of channels. The second set of fins extend radially and are coaxial with each other. The second set of fins forms a second set of channels. Channels of the first and second sets of channels are disposed in an alternating pattern in a circumferential direction of the heat exchanger. The first and second sets of fins are integrally formed together. A cross-sectional width of a channel of at least one of the first set of channels and the second set of channels increases as a radial distance from a centerline axis of the heat exchanger increases.

A method of manufacturing a heat exchanger includes forming a first and a second set of fins via layer-by-layer additive manufacturing. The first set of fins extend radially, are coaxial with each other, and form a first set of channels. A second set of fins extends radially and are coaxial with each other. The second set of fins forms a second set of channels. The channels of the first and second sets of channels are disposed in an alternating pattern in a circumferential direction. The first and second sets of fins are integrally formed together. A cross-sectional width of a channel of at least one of the first set of channels and the second set of channels increases as a radial distance from a centerline axis of the heat exchanger increases. A curved exterior wall is formed with layer-by-layer additive manufacturing and such that the curved exterior wall is integrally formed to the first and second sets of fins. The first and second sets of fins are contained within the exterior wall.

The present summary is provided only by way of example, and not limitation. Other aspects of the present disclosure will be appreciated in view of the entirety of the present disclosure, including the entire text, claims, and accompanying figures.

Figure 1:
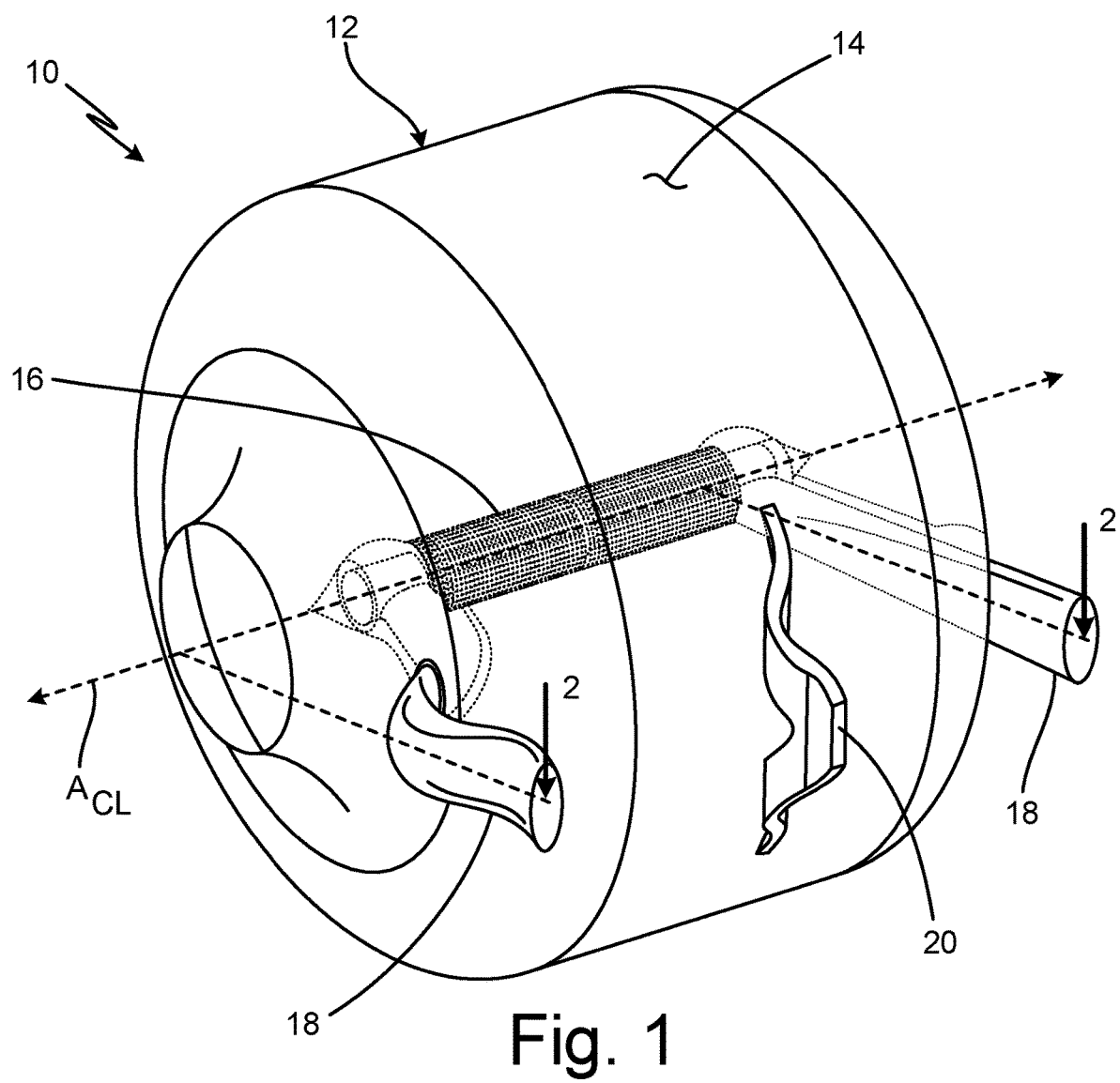
FIG. 1 is a perspective view of a heat exchanger with mounting arms connected to a central spar.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents a heat exchanger core with a round/curved exterior and radial fluid channels with varying cross-sectional widths. This geometry increases the overall thermal energy transfer and pressure drop efficiency of the core while decreasing the total volume of the heat exchanger.

FIG. 1 is a perspective view of heat exchanger 10, which includes body 12 (with exterior skin 14), central spar 16 (extending along centerline axis $A_{CL}$), mounting arms 18, and external mount 20.

Heat exchanger 10 is a device for transferring thermal energy between two or more fluids. In this example, heat exchanger 10 is a heat exchanger used in an aircraft. Also in this example, heat exchanger 10 and all of its components are built as a single, monolithic piece of material via layer-by-layer additive manufacturing. In this non-limiting embodiment, a type of additive manufacturing used to build heat exchanger 10 can include a powder bed fusion process such as selective laser sintering, direct metal laser sintering, and/or electron beam melting.

Body 12 is a main portion of heat exchanger 10. In this example, body 12 includes a cylindrical shape with curved or rounded ends. In this example, body 12 contains a heat exchanger core with fins (not shown in FIG. 1; see e.g., FIG. 2). Exterior skin 14 is an external surface of body 12. Central spar 16 is a cylindrical piece of solid material. Mounting arms 18 are elongate extensions of solid material. In this non-limiting embodiment, mounting arms 18 include an oval or elliptical cross-section shape. Additionally, mounting arms 18 can include a straight or wavy configuration as shown in FIG. 1 (see e.g., FIG. 3). External mount 20 is a band or ribbon or solid material. Centerline axis $A_{CL}$ is a central axis of body 12 and of heat exchanger 10.

Heat exchanger 10 and all of its components (e.g., body 12, exterior skin 14, central spar 16, mounting arms 18, and/or external mount 20) are integrally formed together as a single, monolithic piece of material via layer-by-layer additive manufacturing. Body 12 is connected to external mounting surfaces (not shown in FIG. 1). For example, body 12 can be connected to an engine or an engine housing via mounting arms 18 and/or external mount 20. Exterior skin 14 defines an exterior of body 12. Central spar 16 is disposed in the center of body 12. In this example, central spar 16 is disposed coaxially with centerline axis $A_{CL}$ of body 12. In other words, central spar 16 is coaxial with centerline axis $A_{CL}$ of body 12.

Mounting arms 18 are connected to and extend radially from central spar 16. In this example, mounting arms 18 connect to central spar 16 at the longitudinal ends of central spar 16. Mounting arms 18 are integrally formed with central spar 16 via layer-by-layer additive manufacturing. Also in this example, distal ends of mounting arms 18 can connected to the engine or the engine housing of the aircraft. In this non-limiting embodiment, a major axis of mounting arms 18 can be perpendicular (e.g., orthogonal) to centerline axis $A_{CL}$ of heat exchanger 10. External mount 20 is formed with, is connected to, and extends radially outward from exterior skin 14. In this example, external mount 20 is integrally formed with exterior skin 14 via layer-by-layer additive manufacturing.

Heat exchanger 10 transfers thermal energy between two or more fluids. For example, heat exchanger 10 utilizes multiple fin arrays contained within body 12 to direct multiple flows of fluid across the fins in order to transfer thermal energy from a first fluid, to the fins, and to a second fluid. Exterior skin 14 provides structural support for internal fin arrays disposed within body 12. Exterior skin 14 also provides a fluidic barrier that guides fluid through body 12 and prevent fluid from escaping out of body 12 in locations other than designated inlets and outlets of body 12. Central spar 16 is a central mounting point to which mounting arms 18 connect to. In one example, central spar 16 transfers loads (e.g., vibrational, thermo-dynamic, etc.) from mounting arms 18 to body 12 of heat exchanger 10. In another example, central spar 16 transfers loads (e.g., vibrational, thermo-dynamic, etc.) from body 12 to mounting arms 18 and on to the external mounting surfaces mounting arms 18 are mounted to.

Mounting arms 18 mount and connect heat exchanger 10 to an external mounting surface or surfaces (e.g., within an aircraft). Mounting arms 18 also transfer loads (e.g., vibrational, thermo-dynamic, etc.) to/from central spar 16 from/to external mounting surfaces to which mounting arms 18 are attached.

External mount 20 provides an additional mounting location for body 12 to attach to an external mounting surface. As will be discussed with respect to subsequent figures, incorporation of central spar 16 enables the heat exchanger core to mount to central spar 16 which allows the heat exchanger core to grow in length and diameter. Additionally, as thermal, vibratory, and/or pressure loads are applied across heat exchanger 10, strain at the connection points between heat exchanger 10 and the external structure to which it is mounted via mounting arms 18 are significantly reduced. In addition, central spar 16 is designed with additional compliance to further reduce strain at the connections between heat exchanger 10 via mounting arms 18 and the external structure.

Figure 2:
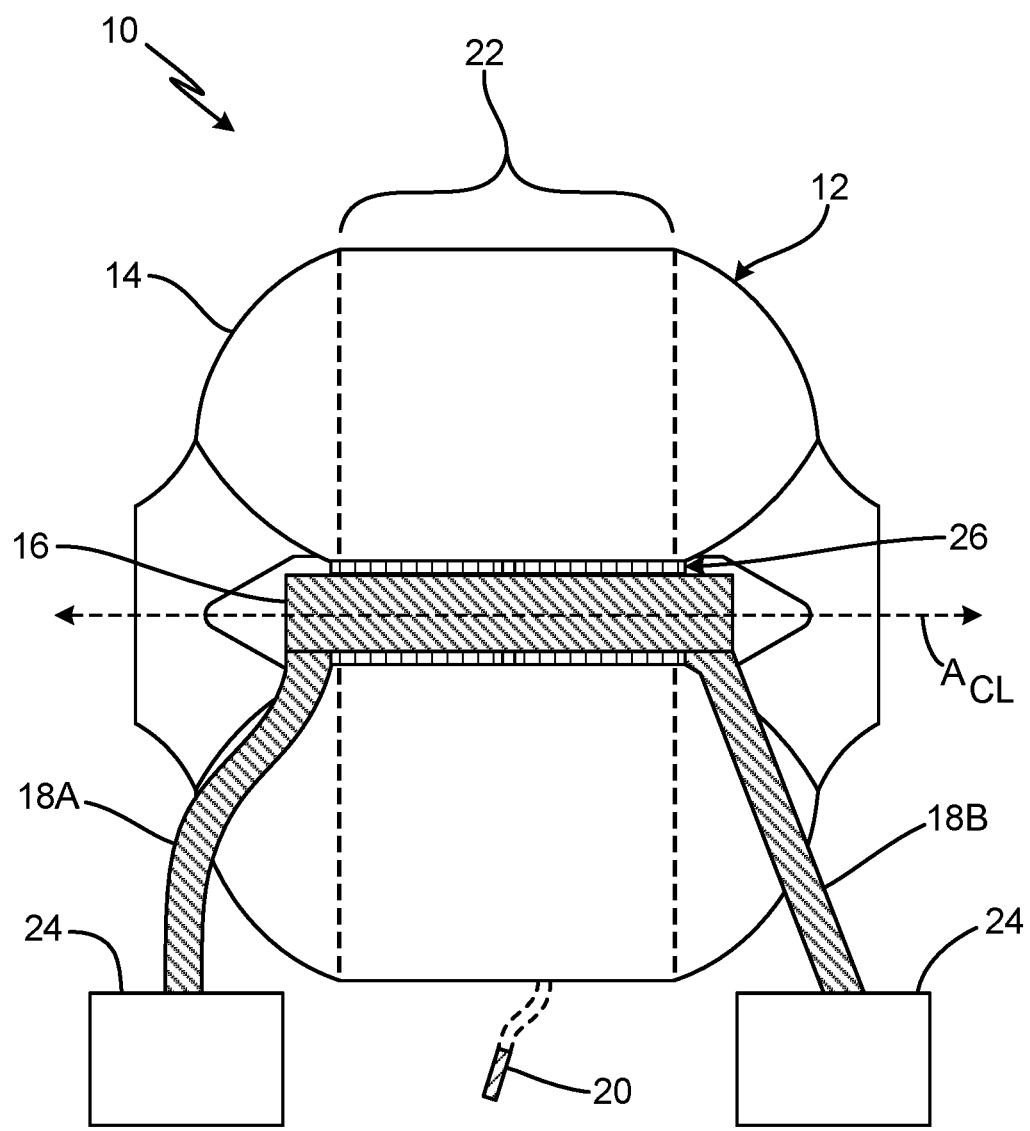
FIG. 2 is a cross-section view of the heat exchanger taken along 2-2 shown in FIG. 1.

FIG. 2 is a cross-section view of heat exchanger 10 taken along 2-2 shown in FIG. 1 and shows body 12, exterior skin 14, central spar 16, mounting arms 18, external mount 20, heat exchanger core 22, external mounting surfaces 24, connection region 26, and centerline axis $A_{CL}$.

Here, centerline axis $A_{CL}$ is shown as also being a longitudinal axis of central spar 16. Heat exchanger core 22 is an array of fins and fluidic channels. For example, heat exchanger core 22 includes a plurality of radially extending plate fins that form fluidic channels therebetween. In another example, heat exchanger core 22 can include a stacked plate fin type core with a non-radial configuration such as a cuboid or other type of polyhedron. External mounting surfaces 24 are surfaces of a component external to heat exchanger 10 to which mounting arms 18A and 18B are mounted to. In this example, external mounting surfaces 24 can be a surface of an engine or an engine housing in an aircraft. Connection region 26 is a region of connection points between central spar 16 and heat exchanger core 22.

Central spar 16 is disposed in a center of heat exchanger core 22. In this example, central spar 16 is disposed coaxially with centerline axis $A_{CL}$ of heat exchanger core 22. In other words, central spar 16 is coaxial with centerline axis $A_{CL}$ of heat exchanger core 22. In another non-limiting embodiment where heat exchanger core 22 includes a polyhedral shape, central spar 16 can be disposed along a middle/center of heat exchanger core 22, where the channels and fins of heat exchanger core 22 can be flat and polygonal shaped. Heat exchanger core 22 is disposed within exterior skin 14 of body 12. For example, heat exchanger core 22 occupies an internal space formed by exterior skin 14. Heat exchanger core 22 is connected to and integrally formed with central spar 16 via connection region 26. Mounting arms 18A and 18B are mounted or affixed to external mounting surfaces 24. In this example, external mounting surfaces include receptacles for receiving ends of mounting arms 18A and 18B. Connection region 26 is integrally formed with, connected to, and extends radially between central spar 16 and heat exchanger core 22.

Heat exchanger core 22 transfers thermal energy between two or more fluids. For example, heat exchanger core 22 utilizes multiple fin arrays contained within body 12 to direct multiple flows of fluid across the fins in order to transfer thermal energy from a first fluid, to the fins, and to a second fluid. In this example, heat exchanger core 22 is configured to thermally expand in the axial and radial directions relative to centerline axis $A_{CL}$. For instance, as central spar 16 expands and contracts in response to thermal expansion, heat exchanger core 22 and connection region 26 expand or contract with central spar 16. External mounting surfaces 24 serve as mounting points to which mounting arms 18A and 18B connect.

Connection region 26 connects heat exchanger core 22 to central spar 16. Connection region 26 includes a flexibility allowing for heat exchanger core 22 to expand and contract in both axial and radial directions as central spar 16 grows and contracts due to thermal expansion. Likewise, the flexibility of connection region 26 also allows for central spar 16 to expand and contract in both axial and radial directions as heat exchanger core 22 grows and contracts due to thermal expansion.

As heat exchanger core 22 expands with central spar 16 and with connection region 26, the points of connection between central spar 16, connection region 26, and heat exchanger core 22 experience decreased amounts of stress and strain as compared to connection points in existing configurations of heat exchangers without additively manufactured components such as central spar 16 and connection region 26 that are able to expand and contract with each other in the axial and radial directions.

Figure 3:
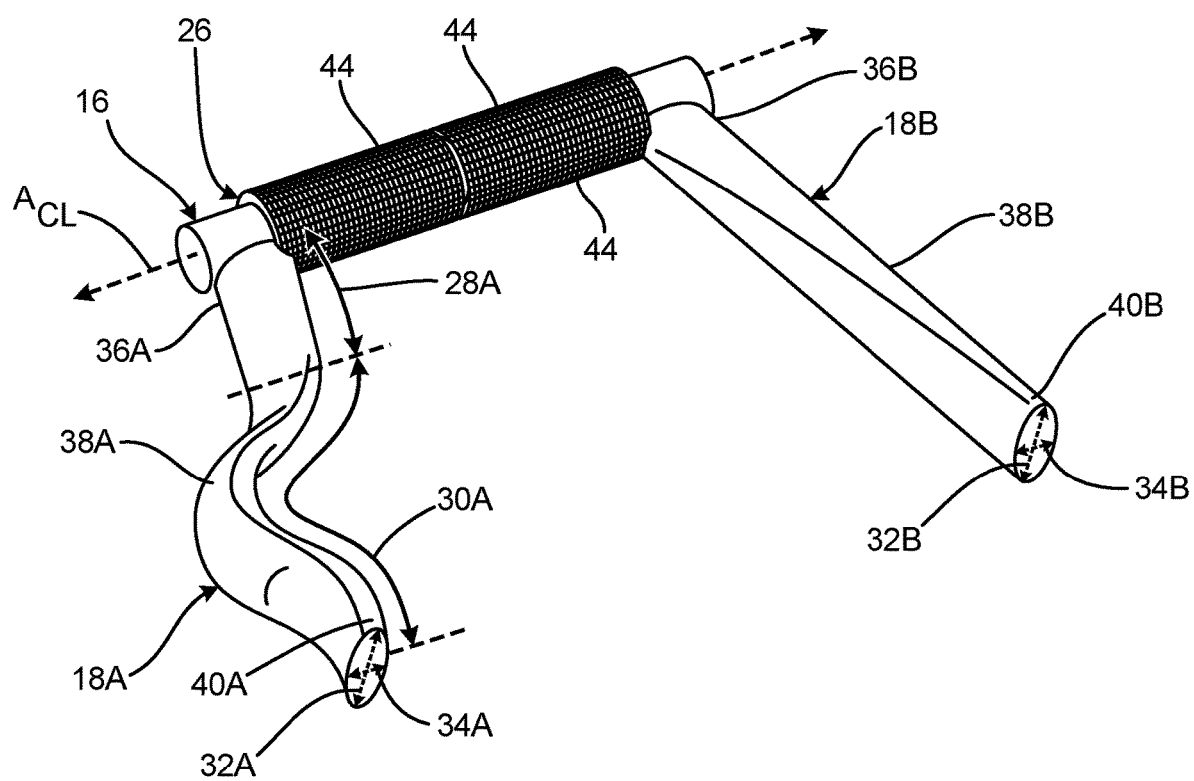
FIG. 3 is an isolated view of the central spar and the mounting arms.

FIG. 3 is an isolated view of central spar 16 and mounting arms 18A and 18B and shows mounting arm 18A (with straight portion 28A, wavy portion 30A, major axis 32A, minor axis 34A, proximal end 36A, midpoint 38A, and distal end 40A), mounting arm 18B (with minor axis 34B, proximal end 36B, midpoint 38B, and distal end 40B), and connection region 26 (with support members 44).

Mounting arm 18A is a wavy, curved piece of solid material with an elliptical or oval cross-section shape. Straight portion 28A and wavy portion 30A are first and second portions of mounting arm 18A. Major axis 32A is one of two axes defining the elliptical cross-section shape of mounting arm 18A. Minor axis 34A is the second of two axes defining the elliptical cross-section shape of mounting arm 18A. Proximal end 36A is an end of mounting arm 18A closest to central spar 16. Midpoint 38A is a midpoint of a length of mounting arm 18A. Distal end 40A is an end of mounting arm 18A furthest from central spar 16. Mounting arm 18B is a straight, elongate piece of solid material also with an elliptical or oval cross-section shape.

Major axis 32B is one of two axes defining the elliptical cross-section shape of mounting arm 18B. Minor axis 34B is the second of two axes defining the elliptical cross-section shape of mounting arm 18B. Proximal end 36B is an end of mounting arm 18B closest to central spar 16. Midpoint 38B is a midpoint of a length of mounting arm 18B. Distal end 40B is an end of mounting arm 18B furthest from central spar 16. Connection region 26 is an annular region containing support members 44. Support members 44 are a plurality of rings or annular disks. In other non-limiting embodiments, support members 44 can include a round or spring shape In the illustrated example, mounting arm 18A includes straight portion 28A connected to central spar 16 and wavy portion 30A connected to straight portion 28A. In other non-limiting embodiment, wavy portion 30A can be directly connected to central spar 16 with straight portion 28A connected to an end of wavy portion 30A. In this example, major axis 32A is displayed at distal end 40A of mounting arm 18A. Here, major axis 32A is shown as perpendicular, or orthogonal, to centerline axis $A_{CL}$ of central spar 16. In other non-limiting embodiments, major axis 32A of mounting arm 18A at distal end 40A can be parallel to centerline axis $A_{CL}$ as well as non-parallel and non-orthogonal to centerline axis $A_{CL}$.

In at least one illustrated example, minor axis 34A is displayed at distal end 40A of mounting arm 18A. Here, minor axis 34A is shown as parallel to centerline axis $A_{CL}$ of central spar 16. In other non-limiting embodiments, minor axis 34A of mounting arm 18A at distal end 40A can be perpendicular, or orthogonal, to centerline axis $A_{CL}$ as well as non-parallel and non-orthogonal to centerline axis $A_{CL}$. Proximal end 36A of mounting arm 18 is connected to central spar 16. In this example, distal end 40A is connected to external mounting surface 24 (see e.g., FIG. 2). Mounting arm 18B is connected to central spar 16 at proximal end 36A.

In this example, major axis 32B is displayed at distal end 40B of mounting arm 18B. Here, major axis 32B is shown as perpendicular, or orthogonal, to centerline axis $A_{CL}$ of central spar 16. In other non-limiting embodiments, major axis 32B of mounting arm 18B at distal end 40B can be parallel to centerline axis $A_{CL}$ as well as non-parallel and non-orthogonal to centerline axis $A_{CL}$. In this example, minor axis 34B is displayed at distal end 40B of mounting arm 18B. Here, minor axis 34B is shown as parallel to centerline axis $A_{CL}$ of central spar 16. In other non-limiting embodiments, minor axis 34B of mounting arm 18B at distal end 40B can be perpendicular, or orthogonal, to centerline axis $A_{CL}$ as well as non-parallel and non-orthogonal to centerline axis $A_{CL}$.

Proximal end 36B of mounting arm 18B is connected to central spar 16. In this example, distal end 40B is connected to one of external mounting surfaces 24. Connection region 26 is disposed radially between central spar 16 and heat exchanger core 22 (omitted from FIG. 3 for clarity). In this example, heat exchanger core 22 is formed with and connected to radially outer ends of support members 44. Support members 44 are integrally formed with and extend radially outward from central spar 16. In this example, support members 44 are integrally formed with central spar 16 via layer-by-layer additive manufacturing.

During operation of heat exchanger 10, thermal dynamic loads and deltas are applied to and across central spar 16. As these thermal dynamic loads and deltas are applied to and across central spar 16, central spar 16 expands and contracts due to thermal expansion of a material of central spar 16. Due to the cylindrical configuration of central spar 16, as central spar 16 absorbs thermal energy, central spar 16 expands both radially and axially along centerline axis $A_{CL}$. As central spar 16 expands axially along centerline axis $A_{CL}$, the connection points of mounting arms 18A and 18B to central spar 16 also move axially outward. Due to the elliptical cross-section shapes of mounting arms 18A and 18B, mounting arms 18A and 18B bend and flex to allow the thermal growth of central spar 16 while reducing strain and stress a the connection points of mounting arms 18A and 18B with external mounting surfaces.

Wavy portion 30A enables mounting arm 18A to more easily bend along wavy portion 30A due to its preformed curvature. This preformed curvature is biased to bend more easily than a straight portion of material (such as in comparison to straight portion 28A or in comparison to mounting arm 18B). The elliptical shapes of mounting arms 18A and 18B allow for higher degrees of bending along the directions of minor axes 34A and 34B in comparison to bending along the directions of major axes 32A and 32B. In this example, major axes 32A and 32B are oriented perpendicular to centerline axis $A_{CL}$ at distal ends 34A and 34B. Due to this perpendicular alignment of major axes 32A and 32B of mounting arms 18A and 18B at distal ends 34A and 34B, mounting arms 18A and 18B are able to bend and flex parallel to centerline axis $A_{CL}$ thereby allowing for thermal expansion of central spar 16 without placing undue strain and stress at the point of connection between mounting arms 18A and 18B and the external mounting surfaces.

As can be seen in FIG. 3, major axes 32A and 32B and minor axes 34A and 34B can vary their orientations relative to centerline axis $A_{CL}$ as a function of distance from central spar 16. For example, FIG. 3 shows mounting arm 18B as having major axis 32B perpendicular to centerline axis $A_{CL}$ and minor axis 34B as being parallel to centerline axis $A_{CL}$ at distal end 40B. In contrast, at the location of proximal end 36B, mounting arm 18B includes a minor axis that is perpendicular to centerline axis $A_{CL}$ and a major axis that is parallel to centerline axis $A_{CL}$. These orientations can be adjusted along a length of mounting arm 18B (and mounting arm 18A) in order to customize a degree of flex or bendability along each of mounting arms 18A and 18B.

Support members 44 of connection region 26 bend, compress, and expand as central spar 16 and heat exchanger core 22 expand and contract due to thermal growth. In this example, support members 44 include compliant disks with a series of tabs (see e.g., FIGS. 4A and 4B) including curved portions allowing for flexing in both the radial and axial directions relative to central spar 16.

Without mounting arms 18A and 18B being able to bend and flex in response to the axial growth of central spar 16, the stress and strain at the connection points of mounting arms 18A and 18B at both central spar 16 and the external mounting surfaces could cause damage or failure at those connection points during instances of extreme thermal or vibratory loads.

Heat exchanger 10 with central spar 16 and mounting arms 18A and 18B provides a connection between central spar 16 and heat exchanger core 22 via structural members (support members 44) incorporating compliance in specific axes/directions. In addition, with mounting arms 18A and 18B being integrally joined to central spar 16, compliance in a specific axis (such as in an axial direction relative to centerline axis $A_{CL}$). These features provide the benefits of a reduction in loading at the mounting interface of heat exchanger 10 allowing elimination or reduction in size or use of bearings used existing configurations to allow displacement at the connections between the heat exchanger and mounting structure, reduced part count, reduced overall system weight, and improved thermal capability of heat exchanger 10.

Figure 4A:
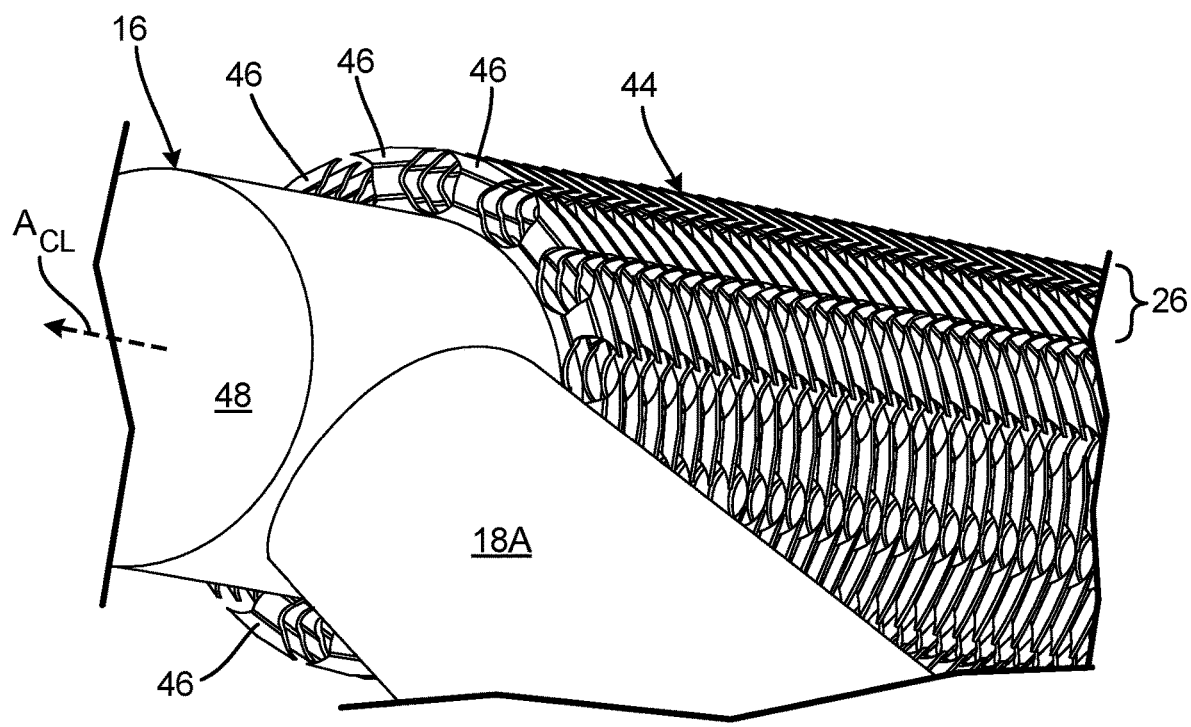
FIG. 4A is an enlarged view of the central spar with a plurality of rings.
Figure 4B:
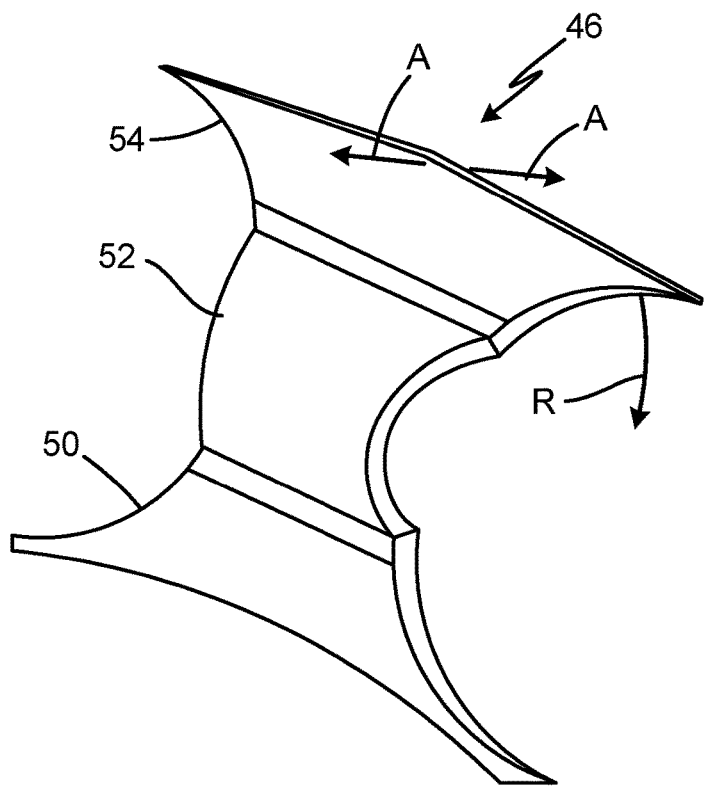
FIG. 4B is an isolation view of a tab of a ring of the central spar.

FIG. 4A is an enlarged view of central spar 16 and shows a portion of mounting arm 18B, connection region 26, support members 44 (with tabs 46), and shaft 42 of central spar 16. FIG. 4B is an isolation view of a single tab 46 with inner portion 50, middle portion 52, and outer portion 54. FIGS. 4A and 4B will be discussed in tandem.

Each of support members 44 include a plurality of tabs 46. Tabs 46 are thin, axially extending pieces of solid material. Shaft 42 is a cylinder of solid material. Inner portion 50 is a radially inward portion of tab 46. Inner portion 50 includes a flat or straight cross-section shape. Middle portion 52 is a middle radial portion of tab 46. In this example, middle portion 52 includes a curved cross-section shape. Outer portion 54 is an outward radial portion of tab 46. Outer portion 54 includes a flat or straight cross-section shape.

Here, support members 44 are shown as being integrally formed with and extending radially from shaft 42 of central spar 16. Tabs 46 are connected to a radially outer surface of shaft 42. Tabs 46 are integrally formed with shaft 42 via layer-by-layer additive manufacturing. In this example, radially outer ends of tabs 46 are connected to and integrally formed with heat exchanger core 22 (see e.g., FIG. 2). Shaft 42 is disposed coaxial with centerline axis $A_{CL}$ and is integrally formed with inner portions 44 of tabs 46. Inner portion 50 is connected to and disposed between shaft 42 and middle portion 52 on tab 46. Middle portion 52 is connected to and disposed between inner portion 44 and outer portion 54. Outer portion 54 is connected to middle portion 52 and is disposed on a radially outward end of tab 46.

Tabs 46 of support member 44 bend and flex as central spar 16 expands and contracts due to increases and decreases in an amount of thermal energy transferred to or away from central spar 16. Tabs 46 also bend and flex in response to vibrations of either heat exchanger 10 or the mounting surface to which mounting arms 18A and 18B (shown in FIG. 3) are mounted to. For example, tabs 46 can bend through middle portion 52 due to the curved cross-sectional shape of middle portion 52. Shaft 42 provides structural support to tabs 46 and to mounting arm 18A. As central spar 16 absorbs thermal energy, shaft 42 expands axially and radially.

Inner portion 50 attaches tab 46 to shaft 42 of central spar 16. The curved cross-section shape of middle portion 52 acts as a flexible member to allow tab 46 to bend and flex as thermal expansion and vibrational loads are applied to both central spar 16 from heat exchanger 10 and from mounting arms 18A and 18B. Outer portion 54 attaches to heat exchanger core 22 and attaches heat exchanger core 22 to tab 46.

Support members 44 of tabs 46 provide a stiff enough connection between heat exchanger core 22 and central spar 16 to support vibrational loads while also providing enough flexibility in both the axial and radial directions to allow for thermal expansion of body 12 (see e.g., FIG. 1) without placing critical amounts of stress or strain on the mounting locations of heat exchanger 10.

Figure 5:
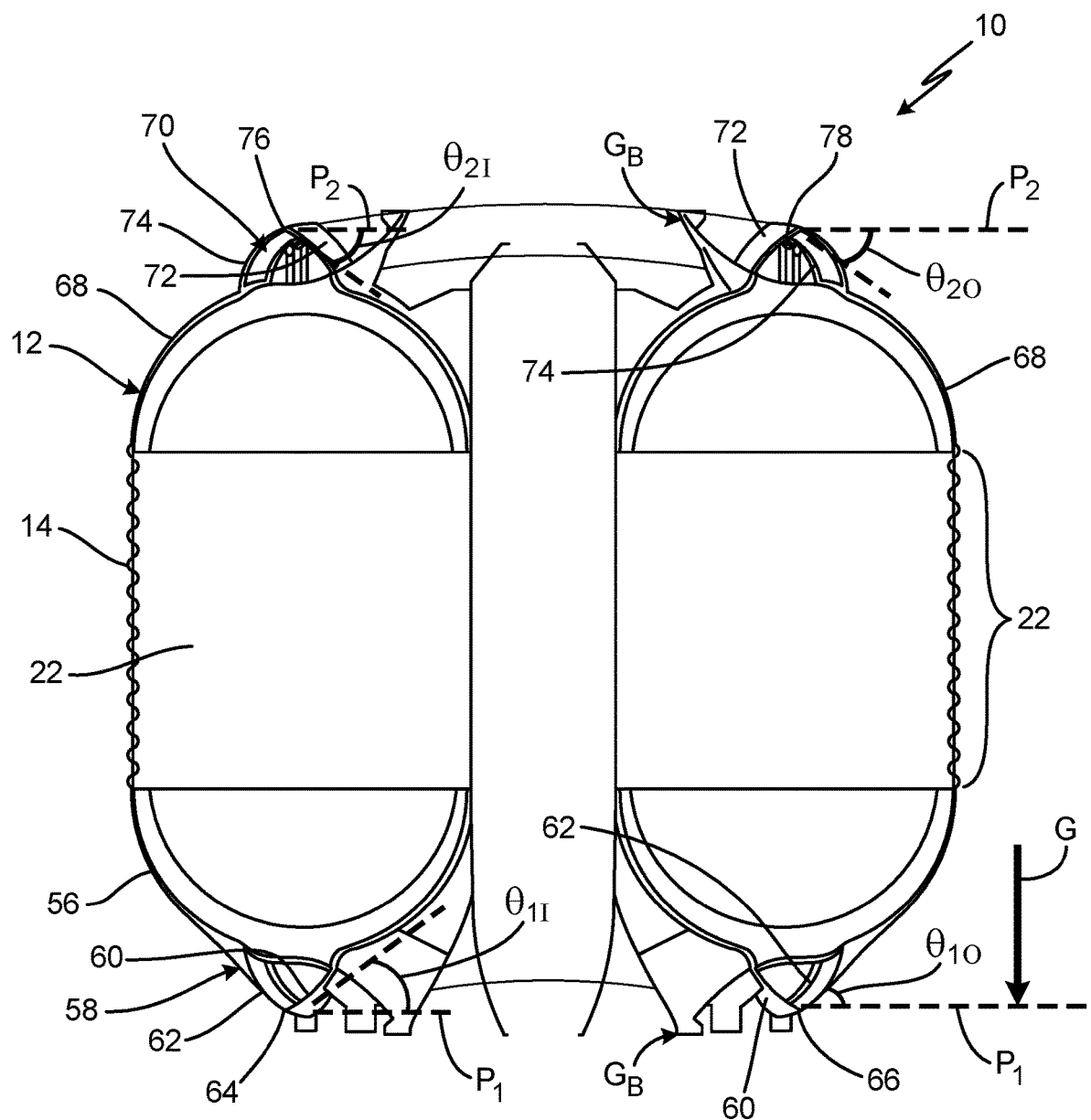
FIG. 5 is a supplementary cross-section view of a portion of the heat exchanger.

FIG. 5 is a supplementary cross-section view of heat exchanger 10 and shows body 12, exterior skin 14, central spar 16, mounting arms 18, external mount 20, heat exchanger core 22, external mounting surfaces 24, connection region 26, first header 56 (with first annulus 58, first radially inward sidewall 60, first radially outward sidewall 62, first convergent point 64, and drain port 66), second header 68 (with second annulus 70, second radially inward sidewall 72, second radially outward sidewall 74, second convergent point 76, and vent port 78), and centerline axis $A_{CL}$. In FIG. 5, central spar 16, mounting arms 18, external mount 20, external mounting surfaces 24, and connection region 26 are omitted for clarity.

First header 56 and second header 68 are hollow, curved portions of solid material. In this example, first header 56 and second header include shapes of a half ring torus. First annulus 58 and second annulus 72 are hollow, annular shaped components. First radially inward sidewall 60, first radially outward sidewall 62, second radially inward sidewall 72, and second radially outward sidewall 74 are angled, partially curved walls of solid material. First convergent point 64 and second convergent point 76 are angled, connection points. Drain port 66 and vent port 78 are outlet orifices.

First header 56 is a part of body 12 and is located on a first axial end of body 12. In this example, first header 56 is shown on gravitational bottom $G_B$ (e.g., on the downward end as shown in FIG. 5) of body 12. First header 56 is in fluid communication with heat exchanger core 22. First annulus 58 is integrally formed with and connected to a gravitational bottom of first header 56. First radially inward sidewall 60 is integrally formed with and connected to a portion of exterior skin 14 along first header 56 and to first radially outward sidewall 62. First radially outward sidewall 62 is integrally formed with and connected to another portion of exterior skin 14 along first header 56 and to first radially inward sidewall 60. First radially outward sidewall 62 connects to first radially inward sidewall 60 to form first convergent point 64. First convergent point 64 extends around a circumference of first annulus 58. Drain port 66 is disposed in a gravitational bottom of first annulus 58 at first convergent point. In this example, a series of drain ports 66 are disposed in and extend around a circumference of first annulus 58 along first convergent point 64.

Second header 68 is a part of body 12 and is located on a first axial end of body 12. In this example, second header 68 is shown on gravitational top $G_T$ (e.g., on the upward end as shown in FIG. 5) of body 12. Second header 68 is in fluid communication with heat exchanger core 22. Second annulus 70 is integrally formed with and connected to a gravitational top of second header 68. Second radially inward sidewall 72 is integrally formed with and connected to a portion of exterior skin 14 along second header 68 and to second radially outward sidewall 74. Second radially outward sidewall 74 is integrally formed with and connected to another portion of exterior skin 14 along second header 68 and to second radially inward sidewall 72. Second radially outward sidewall 74 connects to second radially inward sidewall 72 to form second convergent point 76.

A direction of gravity G is shown in FIG. 5, as well as planes $P_1$ and plane $P_2$. Planes $P_1$ and $P_2$ are oriented perpendicular to gravity G. First radially inward sidewall 60 intersects plane $P_1$ to form first inward angle $\theta_{1I}$. In this example, first inward angle $\theta_{1I}$ is greater than or equal to 40°. First radially outward sidewall 62 intersects plane $P_1$ to form first outward angle $\theta_{1O}$. In this example, first outward angle $\theta_{1O}$ is greater than or equal to 40°. Second radially inward sidewall 72 intersects plane $P_2$ to form second inward angle $\theta_{2I}$. In this example, second inward angle $\theta_{2I}$ is greater than or equal to 40°. Second radially outward sidewall 74 intersects plane $P_2$ to form second outward angle $\theta_{2O}$. In this example, second outward angle $\theta_{2O}$ is greater than or equal to 40°. Second convergent point 76 extends around a circumference of second annulus 70. Vent port 78 is disposed in a gravitational top of second annulus 70 at first convergent point. In this example, a series of vent ports 78 are disposed in and extends around a circumference of second annulus 70 along second convergent point 76.

During operation of heat exchanger 10, first header 56 and second header 68 contain and direct fluids into or out of heat exchanger core 22. First annulus 58 provides a cavity into which excess powder from the additive manufacturing build process can flow into upon completion of additively manufacturing heat exchanger 10. First radially inward sidewall 60 and first radially outward sidewall 62 direct excess powder from the additive manufacturing build process in a downward direction towards first convergent point 64. Drain ports 66 along first convergent point 64 allow collected powder to drain or empty out of first annulus 58 during powder removal post-processing steps of the additive manufacturing build process.

Second annulus 70 provides a cavity into which air pressure can flow into during post-processing (e.g., cleaning) steps during the additively manufacturing build process of heat exchanger 10. Second radially inward sidewall 72 and second radially outward sidewall 74 direct air drawn from body 12 during a cleaning step of heat exchanger 10 out of body 12 and to second convergent point 76. Vent port 78 at second convergent point 76 allows air pressure to be released from heat exchanger 10 during powder removal post-processing steps of the additive manufacturing build process.

In one example, a method of building heat exchanger 10 includes forming heat exchanger 10 with layer-by-layer additive manufacturing. Here, a build-direction of heat exchanger 10 is bottom-to-top, shown as in the opposite direction to gravity G in FIG. 5. Forming heat exchanger 10 includes forming first annulus 58. First annulus 58 is formed to include a conical cross-section shape and to include drain port 66 disposed along a gravitational bottom of first annulus 58. First annulus 58 includes first radially inward sidewall 60 and first radially outward sidewall 62, where first radially inward sidewall 60 and first radially outward sidewall 62 connect together to form first convergent point 64. An angle between first radially inward sidewall 60 and first radially outward sidewall 62 at first convergent point 64 is acute.

First radially inward sidewall 60 is formed such that angle $\theta_{1I}$ between first radially inward sidewall 60 and plane $P_1$ that perpendicular to the direction of gravity is greater than or equal to 40°. First radially outward sidewall 62 is formed such that an angle between first radially outward sidewall 62 and plane $P_1$ that is perpendicular to the direction of gravity is greater than or equal to 40°. Body 12 of heat exchanger 10 is formed such that body 12 is integrally connected to first annulus 58 and such that first annulus 58 is disposed on a gravitational bottom of body 12. Heat exchanger core 22 is formed such that fins of heat exchanger core 22 are parallel with a direction of gravity.

Second annulus 70 that is integrally connected to a gravitational top of body 12 is formed and includes a conical cross-section shape. Second annulus 70 is formed to include vent port 78 disposed on a gravitational top of second annulus 70. Second annulus 70 incudes second radially inward sidewall 72 and second radially outward sidewall 74, where second radially inward sidewall 72 and second radially outward sidewall 74 connect together to form second convergent point 76. An angle between second radially inward sidewall 72 and second radially outward sidewall 74 at second convergent point 76 is acute. Second radially inward sidewall 72 is formed such that an angle between second radially inward sidewall 72 and plane $P_2$ that is perpendicular to the direction of gravity is greater than or equal to 40°. Second radially outward sidewall 74 is formed such that an angle between second radially outward sidewall 74 and plane $P_2$ that is perpendicular to the direction of gravity is greater than or equal to 40°.

Residual powder is collected from body 12 in first annulus 58. Residual powder is removed from heat exchanger 10 and air is vented from body 12 though vent port 78 in second annulus 70. Removing residual powder from heat exchanger 10 includes applying at least one of ultrasonic vibration, low-frequency shock, and a fluid wash to body 12. In particular, residual powder is removed from body 12 through drain port 66 in first annulus 58. Air is vented from body 12 though vent port 78 in second annulus 70.

Orienting the build-direction of heat exchanger 10 opposite to gravity allows for a single-axis orientation set for heat exchanger 10 based on its shape and internal geometry. This orientation enables all internal passages to be formed parallel with the gravitational vector (e.g., gravity G) to allow flow of residual powder in a single direction. Here, because first header 56 and second header 68 are integrally formed together with body 12, the use of vent ports 78 is enabled which breaks any powder removal vacuums created during powder removal process steps. Likewise, the incorporation of conformal, conical first header 56 and radial configuration of heat exchanger core 22 allows for drain port 66 to be located in body 12 at the lowest point of the orientation at which residual powder will be removed.

Some of the benefits enabled by this configuration and build process of heat exchanger 10 include improved powder removal, reduced weight, improved build speed, and improved performance of heat exchanger 10.

Figure 6A:
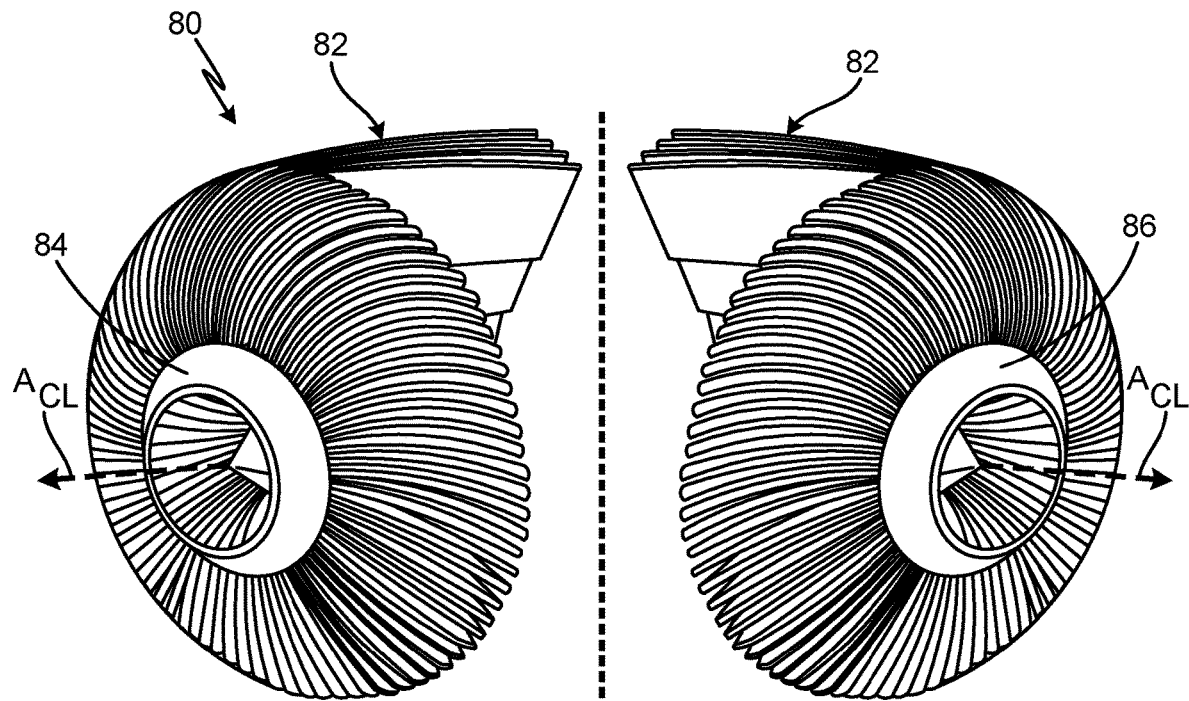
FIG. 6A is a perspective isolation side-by-side view of opposite ends of a first fin circuit of the heat exchanger core.

FIG. 6A is a perspective isolation side-by-side view of first fluid circuit 80 of heat exchanger core 22 and shows first set of fins 82, first inlet header 84, and first outlet header 86.

First fluid circuit 80 is a circuit for transporting a fluid through heat exchanger core 22. First set of fins 82 is a group of sheets of solid material, with open channels passing through the sheets. First inlet header 84 and first outlet header 86 are circular/annular shaped pieces of material that form hollow annuluses therein. First fluid circuit 80 forms a part of heat exchanger core 22 disposed in body 12 of heat exchanger 10. The fins of first set of fins 82 extend radially outward and are coaxial with each other and with centerline axis $A_{CL}$. In this example, first set of fins 82 includes a helical shape or configuration. First inlet header 84 is fluidly connected to and is disposed on an upstream end of first set of fins 82. First outlet header 86 is fluidly connected to and is disposed on a downstream end of first set of fins 82. First inlet header 84 and first outlet header 86 each form a hollow annulus with a centerpoint that is coaxial with centerline axis $A_{CL}$.

First fluid circuit 80 acts as a conduit through which a first fluid passes in order to facilitate the transfer of thermal energy between the first fluid and one or more other fluids passing through heat exchanger core 22 during operation of heat exchanger 10. In this example, first fluid circuit 80 receives and guides a first fluid that is air. First set of fins 82 guide the first fluid through heat exchanger core 22. Via conduction, first set of fins 82 transfers thermal energy between the first fluid and a second fluid passing through heat exchanger core 22. First inlet header 84 controls and directs a flow of the first fluid from an external piping system upstream of heat exchanger core 22 into heat exchanging core 22. First outlet header 86 controls and directs the flow of the first fluid from heat exchanging core 22 another external piping system downstream of heat exchanger core 22.

Figure 6B:
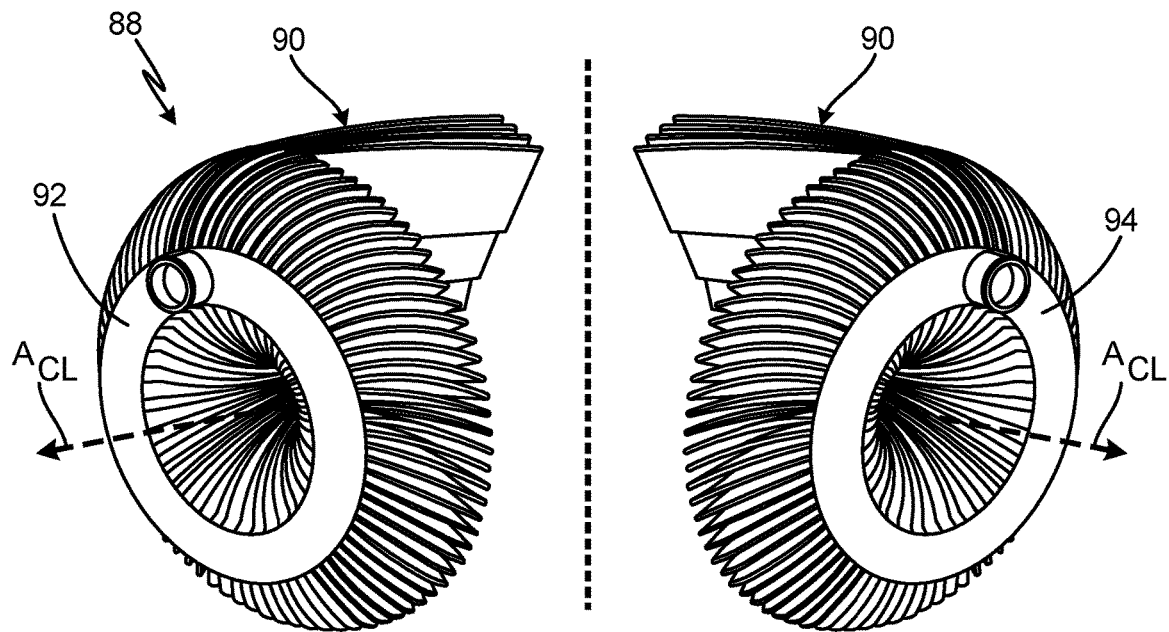
FIG. 6B is a perspective isolation side-by-side view of opposite ends of a second fin circuit of the heat exchanger core.

FIG. 6B is a perspective isolation side-by-side view of second fluid circuit 88 of heat exchanger core 22 and shows second set of fins 90, second inlet header 92, and second outlet header 94.

Second fluid circuit 88 is a circuit for transporting a fluid through heat exchanger core 22. Second set of fins 90 is a group of sheets of solid material, with open channels passing through the sheets. Second inlet header 92 and second outlet header 94 are circular/annular shaped pieces of material that form hollow annuluses therein. Second fluid circuit 88 forms a part of heat exchanger core 22 disposed in body 12 of heat exchanger 10. The fins of second set of fins 90 extend radially outward and are coaxial with each other and with centerline axis $A_{CL}$. In this example, second set of fins 90 includes a helical shape or configuration. Second inlet header 92 is fluidly connected to and is disposed on an upstream end of second set of fins 90. Second outlet header 94 is fluidly connected to and is disposed on a downstream end of second set of fins 90. Second inlet header 92 and second outlet header 94 each form a hollow annulus with a centerpoint that is coaxial with centerline axis $A_{CL}$.

Second fluid circuit 88 acts as a conduit through which a second fluid passes in order to facilitate the transfer of thermal energy between the second fluid and one or more other fluids passing through heat exchanger core 22 during operation of heat exchanger 10. In this example, second fluid circuit 88 receives and guides a second fluid that is fuel. Second set of fins 90 guide the first fluid through heat exchanger core 22. Via conduction, second set of fins 90 transfers thermal energy between the second fluid and a first fluid passing through heat exchanger core 22. Second inlet header 92 controls and directs a flow of the first fluid from an external piping system upstream of heat exchanger core 22 into heat exchanging core 22. Second outlet header 94 controls and directs the flow of the first fluid from heat exchanging core 22 another external piping system downstream of heat exchanger core 22.

Figure 6C:
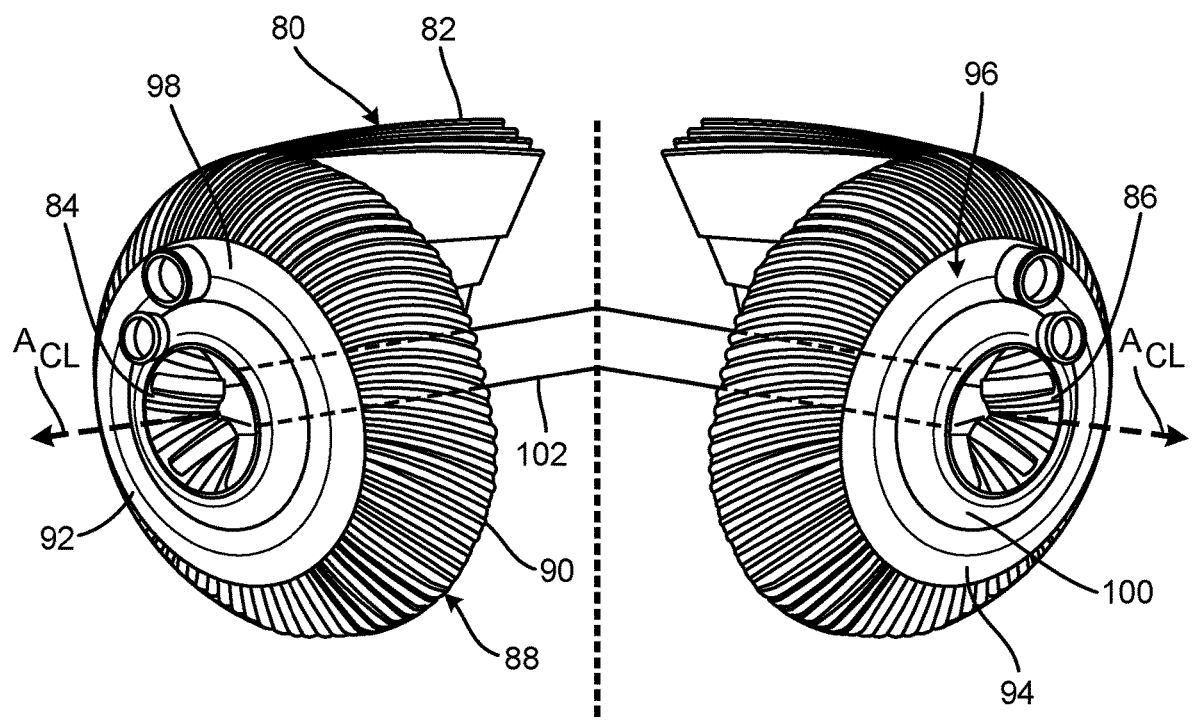
FIG. 6C is a perspective isolation side-by-side view of opposite ends of the first and second fin circuits combined together with a third header.

FIG. 6C is a perspective isolation side-by-side view of first and second fluid circuits 80 and 88 nested together and shows first fluid circuit 80 (with first set of fins 82, first inlet header 84, and first outlet header 86), second fluid circuit 88 (with second set of fins 90, second inlet header 92, and second outlet header 94), and third fluid circuit 96 (with third inlet header 98 and third outlet header 100).

Third fluid circuit 96 is a third circuit for transporting a fluid through heat exchanger core 22. Third inlet header 98 and third outlet header 100 are circular/annular shaped pieces of material that form hollow annuluses therein. Chamber 102 is a pipe or hollow cylinder. Third inlet header 98 is fluidly connected to and is disposed on an upstream end of chamber 102. Third outlet header 100 is fluidly connected to and is disposed on a downstream end of chamber 102. Each of the first, second, and third inlet headers 84, 92, and 98 are shown as being disposed coaxial with each other and with centerline axis $A_{CL}$. First inlet header 84 is the radially inner most header of the first, second, and third inlet headers 84, 92, and 98. Third inlet header 98 is disposed radially outward from first inlet header 84 and is disposed radially inward from second inlet header 92. Second inlet header 92 is disposed radially outward from first inlet header 84 and from third inlet header 98.

In this example, the annular and circular shape of second inlet header 92 conforms to or matches the circular shapes of first inlet header 84 and of third inlet header 98. Likewise, the annular and circular shape of third inlet header 98 conforms to or matches the circular shape of first inlet header 84 and second inlet header 92. Here, first set of fins 82 and second set of fins 90 are shown as being nested with each other. For example, first set of fins 82 and second set of fins 90 are disposed such that the fins of each form an alternating pattern in a circumferential direction. Each fin of first set of fins 82 is positioned between two fins of second set of fins 90. Likewise, each fin of second set of fins 90 is positioned between two fins of first set of fins 82. Each fin of both first and second sets of fins 82 and 90 conform, or match, each other's shape. Chamber 102 is disposed along a center of heat exchanger core 22 and is fluidly connected to both third inlet header 98 and third outlet header 100. Chamber 102 is disposed coaxial with centerline axis $A_{CL}$.

Third fluid circuit 96 acts as a conduit through which a second fluid passes in order to facilitate the transfer of thermal energy between a third fluid and one or more other fluids passing through heat exchanger core 22 during operation of heat exchanger 10. Third inlet header 98 controls and directs a flow of the first fluid from an external piping system upstream of heat exchanger core 22 into heat exchanging core 22. Third outlet header 100 controls and directs the flow of the first fluid from heat exchanging core 22 to another external piping system downstream of heat exchanger core 22. Chamber 102 guides the third fluid through heat exchanger core 22. Chamber 102 acts as a pass-through chamber through which additional fluid is fed. In one non-limiting embodiment, third fluid circuit can be used as a back-up circuit to be used in the instance that one or both of first fluid circuit 80 and/or second fluid circuit 88 breakdown, leak, or fail.

Figure 6D:
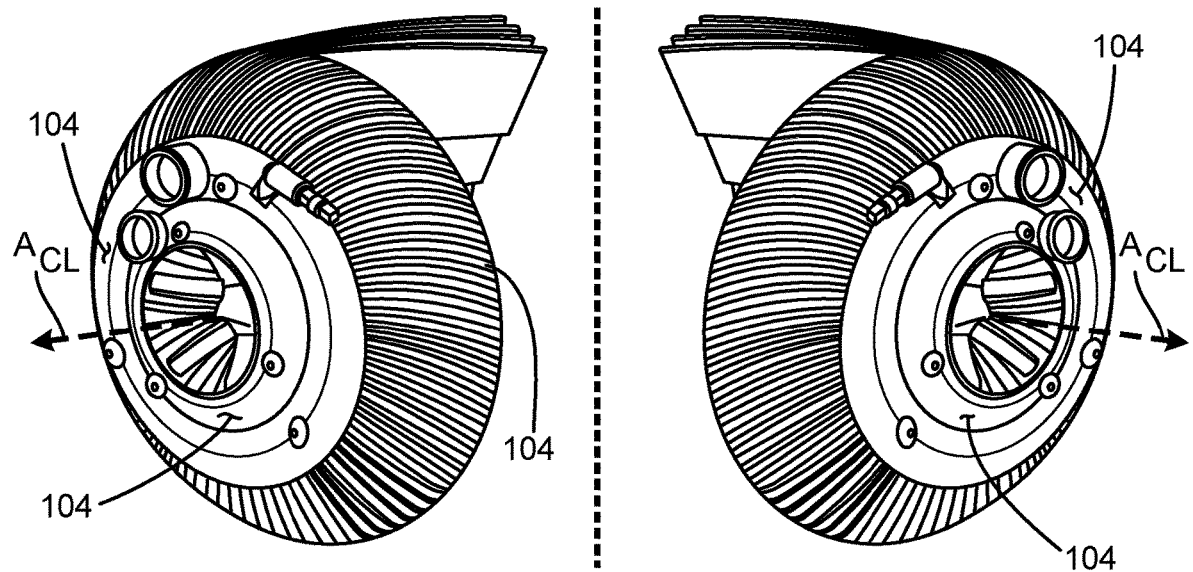
FIG. 6D is a perspective isolation side-by-side view of opposite ends of the first and second fin circuits combined together with the first and a second header.

FIG. 6D is a perspective isolation side-by-side view of first, second, and third fluid circuits 80, 88, and 96 combined together and additionally shows barrier layer 104 disposed on portions of heat exchanger core 22.

Barrier layer 104 is a thin layer or sheet of solid material. In this example, barrier layer 104 surrounds all surfaces of second fluid circuit including second set of fins 90, second inlet header 92, and second outlet header 94. Barrier layer 104 also surrounds the surfaces of third fluid circuit including third inlet header 98, third outlet header 100, and chamber 102. Each of first fluid circuit 80, second fluid circuit 88, third fluid circuit 96, and barrier layer 104 are integrally formed with each other via layer-by-layer additive manufacturing. Barrier layer 104 prevents leakage of the first fluid, second fluid, and/or third fluid between first fluid circuit 80, second fluid circuit 88, and/or third fluid circuit 96. Barrier layer 104 adds a redundant safety feature of heat exchanger core 22 that prevents fluid transfer between any of first fluid circuit 80, second fluid circuit 88, and/or third circuit 96.

Here, first fluid circuit 80, second fluid circuit 88, third fluid circuit 96, and barrier layer 104 are shown as conforming around each other and with a cylindrically packaged radial core (e.g., heat exchanger core 22). With heat exchanger 10, the use of additive manufacturing enables the conforming shapes of first fluid circuit 80, second fluid circuit 88, third fluid circuit 96, and barrier layer 104 that would otherwise be extremely difficult to manufacture using non-additive manufacturing techniques. This conformal aspect of the headers of heat exchanger 10 enables the features of a round/curved exterior, conformal fluid channels, varying of fluid inlet and exit geometries, varying of channel inlet shape, varying of inlet fin profiles, variable fin geometry integral header and core (manufactured as one piece), integrated plumbing in header for other systems such as bypass lines, sensors, or wire ways through center of core, enhanced buildability/powder removal, and the ability to integrate conformal barrier passages.

These features provide the benefits of enhanced pressure and temperature capability vs. weight, increased thermal transient capability, improved total heat exchanger volume vs. heat transfer, improved total heat exchanger volume vs. pressure drop, and improved packaging and system integration through/around other components. In particular, the annular or circular shapes of first, second, and this inlet headers 84, 92, and 98 as well as first, second, and third outlet headers 86, 94, and 100 allow increased temperature and pressure loading capability versus weight (e.g., square corners are eliminated) are removed. Additionally, the shapes of the external header surfaces are conformal to the fluid flows thus allowing incorporation of additional heat transfer surface area in inlet headers 84, 92, and 98 as well as first, second, and third outlet headers 86, 94, and 100 and an increase in overall thermal performance vs. a weight-to-volume ratio of heat exchanger 10.

Figure 7A:
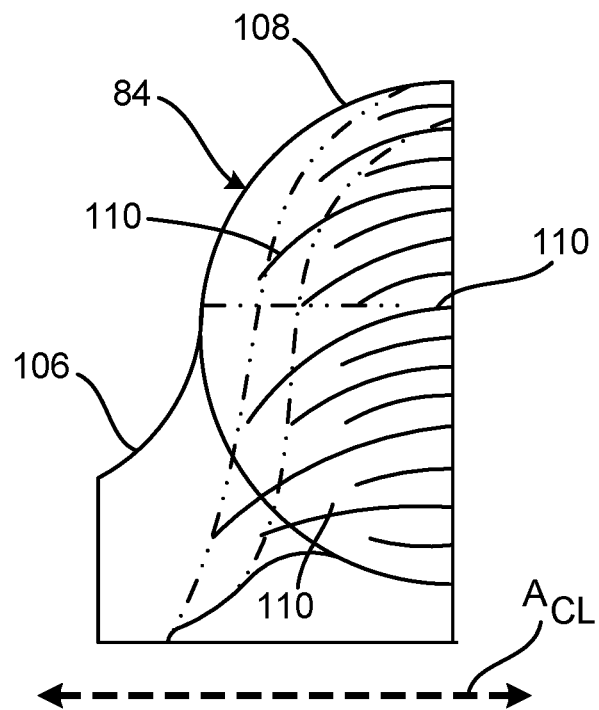
FIG. 7A is a cross-section view of a first header fin arrangement.

FIG. 7A is a cross-section view of first inlet header 84 and shows inlet 106, sidewall 108, and guide fins 110.

Inlet 106 is an inlet port of first inlet header 84. Sidewall 108 is an exterior wall of first inlet header 84. Guide fins 110 are thin sheets of solid material. In this example, guide fins 110 include approximately three different lengths. Inlet 106 extends axially and radially from an upstream (e.g., left as shown in FIG. 7A) end of first inlet header 84. Sidewall 108 extends around an exterior of first inlet header 84. Guide fins 110 are disposed inside of sidewall 108. Guide fins 110 extend and curl towards inlet 106. In this example, each portion of guide fins 110 retains a uniform radius from centerline axis $A_{CL}$ as each of guide fins 110 is revolved about centerline axis $A_{CL}$. Also in this example, guide fins 110 are integrally formed with and connected to heat exchanger core 22.

Inlet 106 guides and transports a flow of the first fluid into first inlet header 84. Sidewall 108 contain the flow of first fluid within first inlet header 84. Guide fins 110 direct various portions of the flow of first fluid from inlet 106 to different radial sections of first inlet header 84. For example, a downstream end (e.g., right end as shown in FIG. 7A) of first inlet header 84 is connected to and formed with an upstream end of heat exchanger core 22. As the first fluid is transferred from first inlet header 84, guide fins 110 direct the first fluid to various radial sections of heat exchanger core 22. Guide fins 110 direct the first fluid to various radial sections of first inlet header 84 with the curved shape of guide fins 110. As the flow of first fluid comes into contact with upstream ends of guide fins 110, guide fins 110 deflect and angle the flow of the first fluid into a radially outward direction.

In addition to directing the flow of the first fluid to all radial sections of heat exchanger core 22, guide fins 110 are arranged to maximize thermal fluid performance and minimize structural stresses of first inlet header 84. With respect to the build process of heat exchanger 10, guide fins 110 help to guide residual powder towards inlet 106 as the residual powder is removed from heat exchanger core 22. First inlet header 84 with guide fins 110 creates fluid channels between each of guide fins 110 that are conformal to each other allowing for optimized heat transfer vs. volume and weight. In addition, the fluid channels between each of guide fins 110 incorporates secondary surface area in the form of guide fins 110 that both direct the flow to maximize fluid distribution entering heat exchanger core 22 as well as heat transfer in first inlet header 84. Likewise, the conformal design of guide fins 110 also allows for integration of barrier layers between fluids when required.

Figure 7B:
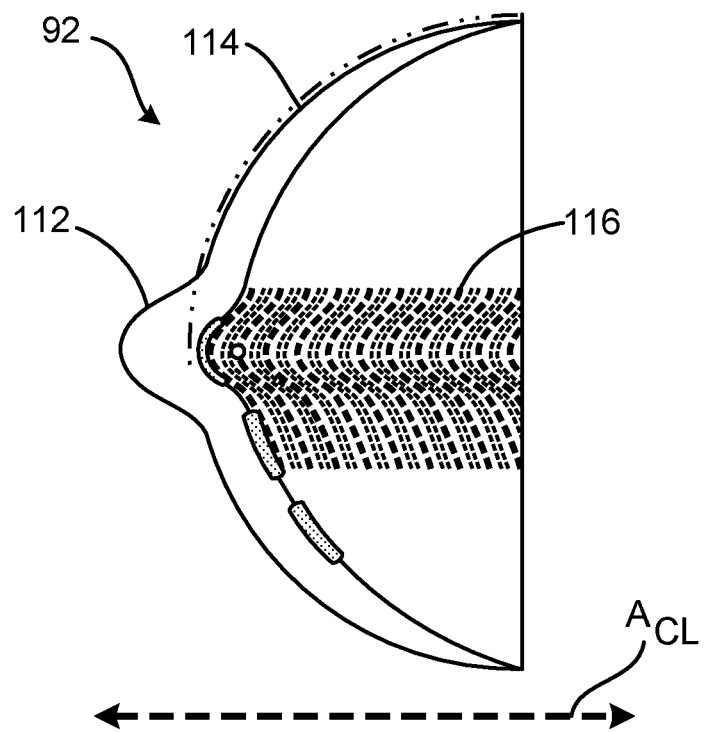
FIG. 7B is a cross-section view of a second header fin arrangement.

FIG. 7B is a cross-section view of second inlet header 92 and shows inlet 112, sidewall 114, and guide fins 116.

Inlet 112 is an inlet port of second inlet header 92. Sidewall 114 is an exterior wall of second inlet header 92. Guide fins 116 are thin sheets of solid material. Inlet 112 extends axially from an upstream (e.g., left as shown in FIG. 7A) end of second inlet header 92. Sidewall 114 extends around an exterior of second inlet header 92. Guide fins 116 are disposed inside of sidewall 114. In this example, a curved shape of guide fines 110 matches or conforms to the curvature of sidewall 114. In this example, each portion of guide fins 116 retains a uniform radius from a center of inlet 112 as each of guide fins 116 is revolved about center of inlet 112 Also in this example, guide fins 116 are integrally formed with and connected to heat exchanger core 22.

Inlet 112 guides and transports a flow of the second fluid into second inlet header 92. Sidewall 114 contain the flow of first fluid within second inlet header 92. Guide fins 116 direct various portions of the flow of first fluid from inlet 112 to different radial sections of second inlet header 92. For example, a downstream end (e.g., right end as shown in FIG. 7A) of second inlet header 92 is connected to and formed with an upstream end of heat exchanger core 22. As the second fluid is transferred from second inlet header 92, guide fins 116 direct the second fluid to various radial sections of heat exchanger core 22. Guide fins 116 direct the second fluid to various radial sections of second inlet header 92 with the curved shape of guide fins 116. As the flow of the second fluid comes into contact with upstream ends of guide fins 116, guide fins 116 deflect and angle the flow of the second fluid into a radially outward direction.

In addition to directing the flow of the second fluid to all radial sections of heat exchanger core 22, guide fins 116 are arranged to maximize thermal fluid performance and minimize structural stresses of second inlet header 92. With respect to the build process of heat exchanger 10, guide fins 116 help to guide residual powder towards inlet 112 as the residual powder is removed from heat exchanger core 22.

Second inlet header 92 with guide fins 116 creates fluid channels between each of guide fins 116 that are conformal to each other allowing for optimized heat transfer vs. volume and weight. In addition, the fluid channels between each of guide fins 116 incorporates secondary surface area in the form of guide fins 116 that both direct the flow to maximize fluid distribution entering heat exchanger core 22 as well as heat transfer in second inlet header 92. Likewise, the conformal design of guide fins 116 also allows for integration of barrier layers between fluids when required.

Figure 8:
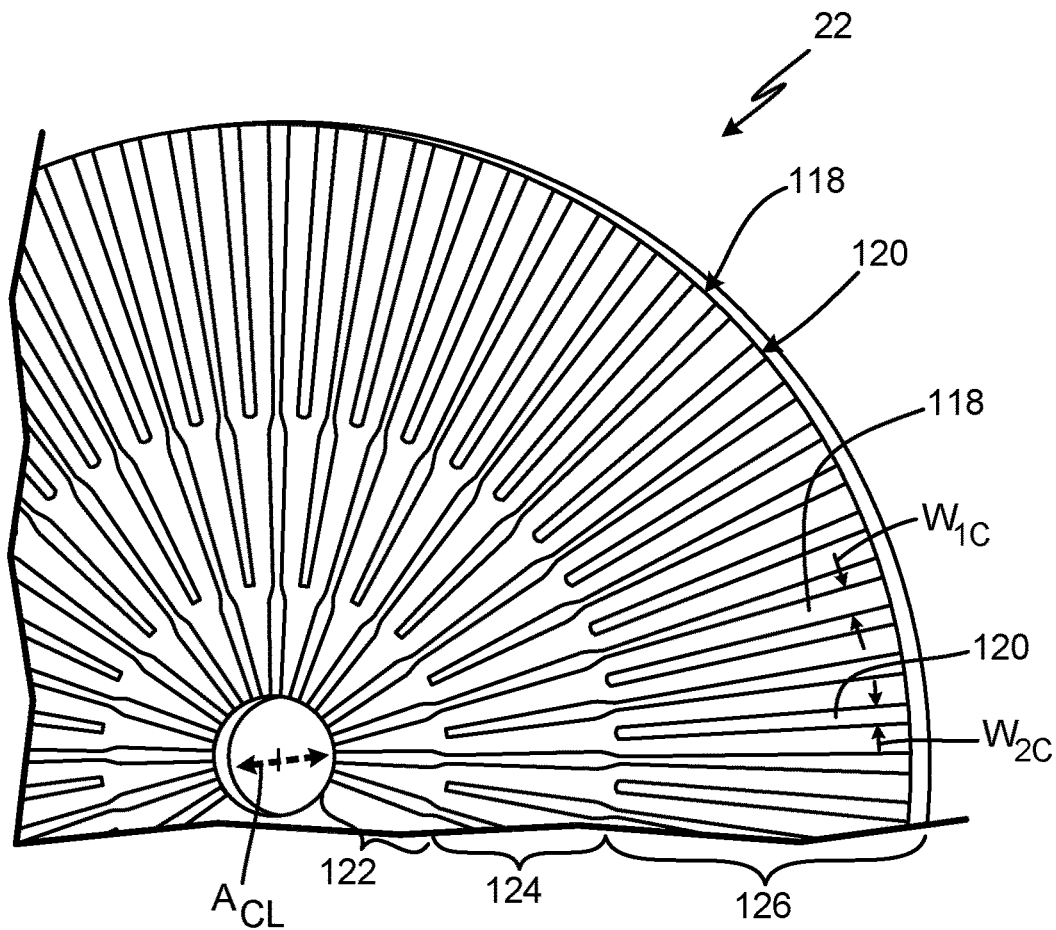
FIG. 8 is a supplementary cross-section view of a portion of the heat exchanger.
Figure 9:
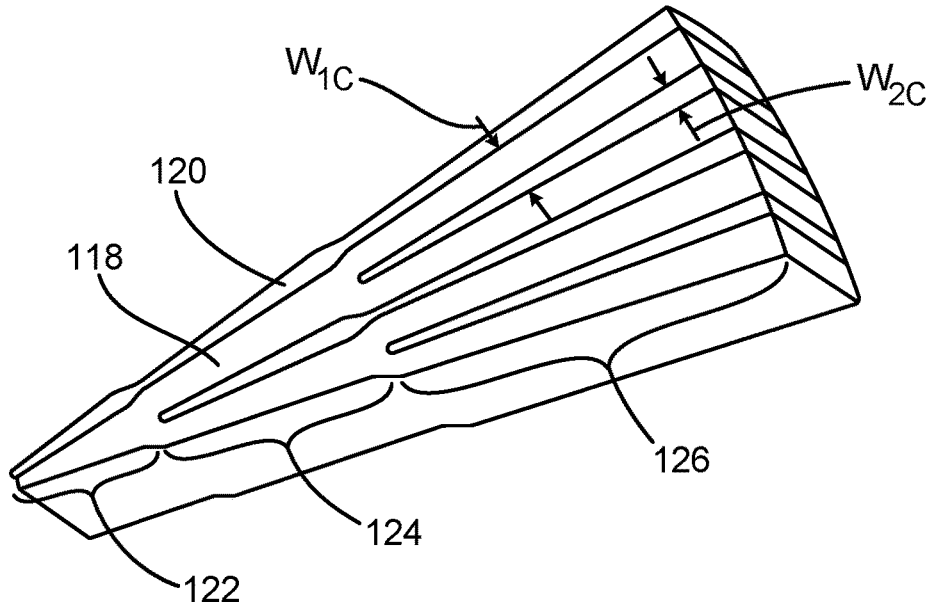
FIG. 9 is a perspective isolated view of a set of fins of a core of the heat exchanger.

FIG. 8 is a supplementary cross-section view of a portion of heat exchanger core 22 and shows first set of channels 118 (each with width $W_{1C}$), second set of channels 120 (each with width $W_{2C}$), first radial region 122, second radial region 124, and third radial region 126. FIG. 9 is a perspective isolated view of heat exchanger core 22 and shows first set of channels 118 (each with width $W_{1C}$), second set of channels 120 (each with width $W_{2C}$), first radial region 122, second radial region 124, and third radial region 126. FIGS. 8 and 9 will be discussed in tandem.

First set of channels 118 and second set of channels 120 are fluidic passages. Each channel of first set of channels 118 includes a tapered shape that increases in width along a radially outward direction. Each channel of second set of channels 120 includes a tapered shape that increases in width along the radially outward direction. Width $W_{1C}$ is a width of a channel of first set of channels 118. Here, width W is measured in a circumferential direction relative to centerline axis $A_{CL}$. Width $W_{2C}$ is a width of a channel of second set 124 of channels 118. Here, width W is measured in a circumferential direction relative to centerline axis $A_{CL}$. First radial region 122, second radial region 124, and third radial region 126 are radially distinct and step-wise sections of heat exchanger core 22. Each of First radial region 122, second radial region 124, and third radial region 126 include a plurality of first set of channels 118 and a plurality of second set of channels.

The channels of first and second sets of channels 118 and 120 extend radially outward relative to axial centerline $A_{CL}$. Channels of first set of channels 118 is nested and interspersed between channels of second set of channels 120. For example, in each of first radial region 122, second radial region 124, and third radial region 126, there is an alternating pattern of channels of first set of channels 118 and channels of second set of channels 118 in a circumferential direction. Each channel of both first set of channels 118 and second set of channels 120 are defined by fins (see e.g., first set of fins 82 and second set of fins 90 in FIGS. 6A and 6B) that define an exterior boundary for each channel (such fins have been omitted from FIG. 8 for clarity). The channels of first set of channels 118 are fluidly isolated from the channels of second set of channels 120.

Width $W_{1C}$ and width $W_{1C}$ vary relative to a radial distance from centerline axis $A_{CL}$ of heat exchanger core 22. In this example, width $W_{1C}$ and width $W_{2C}$ both increase as a radial distance from centerline axis $A_{CL}$ increases. First radial region 122 is disposed radially inward from second radial region 124. Second radial region 124 is disposed radially between first radial region 122 and third radial region 126. Third radial region 126 is disposed radially outward from second radial region 124. In this example, first, second, and third radial regions 122, 124, and 16 extend axially for an entire length of heat exchanger core 22.

First set of channels 118 transports the first fluid through heat exchanger core 22. As the first fluid flows through first set of channels 22 of heat exchanger core, thermal energy is transferred across the fins defining the channels and into the second fluid flowing through second set of channels 120.

With both of width $W_{1C}$ and width $W_{2C}$ both increasing as a radial distance from centerline axis $A_{CL}$ increases, a ratio of width $W_{1C}$ to width $W_{2C}$ is maintained across all radial distances from centerline axis $A_{CL}$. For example, in each of first radial region 122, second radial region 124, and third radial region 126, the ratio of width $W_{1C}$ to width $W_{2C}$ is approximately constant or uniform throughout each of first radial region 122, second radial region 124, and third radial region 126. Width $W_{1C}$ of each channel of first set of channels 118 at a first radial location from centerline axis $A_{CL}$ is greater than width $W_{2C}$ of each channel of second set of channels 120 at the same radial location from centerline axis $A_{CL}$.

In this example, a ratio of a cross-sectional area of a channel of first set of channels 118 to a cross-sectional area of a channel of second set of channels 120 is uniform along a radial direction of heat exchanger core 22. This uniform ratio enables a more uniform transfer of thermal energy across each of first, second, and third radial regions 122, 124, and 126 of heat exchanger core 22.

The round or curved exterior and the round or oval body of heat exchanger 10 allows for increased temperature and pressure loading capability. The variable geometry of the fins and the channels enable variations in geometry that are parallel with the directions of fluid flow through heat exchanger core 22. Likewise, the geometries of the fins and channels can be varied and optimized for thermal energy transfer as fluid flow temperature and fluid density change down a length of heat exchanger core 22. In heat exchanger core 22, fin and channel geometries are varied with flow direction and are optimized for compliance under rapid thermal transients at fluid inlets (e.g., inlets 106 and 112). Additionally, stiffnesses of the fins (e.g., thickness/shape/spacing) can be varied from a center of heat exchanger 10 outwardly to provide compliance in order to allow for expansion and distortion during pressure and temperature transients. Furthermore, the integral one piece configuration of heat exchanger core 22 eliminates challenges with bonding multiple preformed shapes together.

Discussion of Possible Embodiments

A heat exchanger includes a first set of fins, a second set of fins, and an exterior wall. The first set of fins extend radially and are coaxial with each other. The first set of fins forms a first set of channels. The second set of fins extend radially and are coaxial with each other. The second set of fins forms a second set of channels. Channels of the first and second sets of channels are disposed in an alternating pattern in a circumferential direction of the heat exchanger. The first and second sets of fins are integrally formed together. A cross-sectional width of a channel of at least one of the first set of channels and the second set of channels increases as a radial distance from a centerline axis of the heat exchanger increases.

The heat exchanger of the preceding paragraph can optionally include, additionally and/or alternatively, any one or more of the following features, configurations and/or additional components.

The first and second sets of channels can have a first radial region, and/or wherein each channel of the first set of channels can comprise a tapered shape that increases in width along a radially outward direction, each channel of the second set of channels can comprise a tapered shape that increases in width along the radially outward direction, and/or a ratio between a width of a channel of the first set of channels and a width of a channel of the second set of channels can remain approximately constant across the first radial region.

The cross-sectional width of each channel of the first set of channels at a first radial location from the axial centerline of the heat exchanger can be greater than the width of each channel of the second set of channels at the same radial location from the axial centerline of the heat exchanger.

Each fin of the first set of fins can include a helical shape, and/or each fin of the second set of fins can match the helical shape of each fin of the first set of fins.

The channels of the first and second sets of channels can extend radially outward relative to the axial centerline of the heat exchanger.

A ratio of a cross-sectional area of a channel of the first set of channels to a cross-sectional area of a channel of the second set of channels can be uniform along a radial direction of the heat exchanger.

The first and second sets of fins can be integrally formed with the exterior wall via layer-by-layer additive manufacturing.

The first and second sets of channels can be fluidly separated from one another and can be configured to transfer heat from a first fluid flowing through the first set of channels to a second fluid flowing through the second set of channels.

A method of manufacturing a heat exchanger can include forming a first and a second set of fins via layer-by-layer additive manufacturing. The first set of fins can extend radially, can be coaxial with each other, and form a first set of channels. A second set of fins extends radially and can be coaxial with each other. The second set of fins forms a second set of channels. The channels of the first and second sets of channels can be disposed in an alternating pattern in a circumferential direction. The first and second sets of fins can be integrally formed together. A cross-sectional width of a channel of at least one of the first set of channels and the second set of channels increases as a radial distance from a centerline axis of the heat exchanger increases. A curved exterior wall can be formed with layer-by-layer additive manufacturing and such that the curved exterior wall can be integrally formed to the first and second sets of fins. The first and second sets of fins can be contained within the exterior wall.

The method of the preceding paragraph can optionally include, additionally and/or alternatively, any one or more of the following steps, features, configurations and/or additional components.

Each channel of the first set of channels can be formed with layer-by-layer additive manufacturing to comprise a tapered shape that increases in width along a radially outward direction; each channel of the second set of channels can be formed with layer-by-layer additive manufacturing to comprise a tapered shape that increases in width along the radially outward direction; and/or wherein a ratio between a width of a channel of the first set of channels and a width of a channel of the second set of channels can remain approximately constant across a first radial region of the first and second sets of channels.

The cross-sectional width of each channel of the first set of channels at a first radial location from the axial centerline of the heat exchanger can be greater than the width of each channel of the second set of channels at the same radial location from the axial centerline of the heat exchanger.

Each fin of the first set of fins can include a helical shape, and/or each fin of the second set of fins can match the helical shape of each fin of the first set of fins.

The channels of the first and second sets of channels can extend radially outward relative to the axial centerline of the heat exchanger.

A ratio of a cross-sectional area of a channel of the first set of channels to a cross-sectional area of a channel of the second set of channels can be uniform along a radial direction of the heat exchanger.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heat exchanger comprising:
   a first set of fins that extend radially and that are coaxial with each other, wherein the first set of fins forms a first set of channels;
   a second set of fins that extend radially and that are coaxial with each other, wherein:
      the second set of fins and the first set of fins form an alternating pattern in a circumferential direction such that each fin of the first set of fins is positioned between two fins of the second set of fins and each fin of the second set of fins is positioned between two fins of the first set of fins; and
      the second set of fins forms a second set of channels, wherein channels of the first and second sets of channels are disposed in an alternating pattern in a circumferential direction, wherein the first and second sets of fins are integrally formed together, and wherein a cross-sectional width of a channel in the circumferential direction of at least one of the first set of channels and the second set of channels increases as a radial distance from a centerline axis of the heat exchanger increases;
   a curved exterior wall, wherein the first and second sets of fins are contained within the exterior wall;
   a first inlet header and a first outlet header, wherein the first inlet header is fluidly connected to and disposed on an upstream end of the first set of fins, and wherein the first outlet header is fluidly connected to and disposed on a downstream end of the first set of fins;
   a second inlet header and a second outlet header, wherein the second inlet header is fluidly connected to and disposed on an upstream end of the second set of fins, and wherein the second outlet header is fluidly connected to and disposed on a downstream end of the second set of fins; and
   a third inlet header and a third outlet header, wherein the third inlet header is fluidly connected to and disposed on an upstream end of a chamber, and wherein the third outlet header is fluidly connected to and disposed on a downstream end of the chamber.

2. The heat exchanger of claim 1, wherein the first and second sets of channels have a first radial region, and wherein:
   each channel of the first set of channels comprises a tapered shape that increases in width along a radially outward direction;
   each channel of the second set of channels comprises a tapered shape that increases in width along the radially outward direction; and a ratio between a width of a channel of the first set of channels and a width of a channel of the second set of channels remains approximately constant across the first radial region.

3. The heat exchanger of claim 1, wherein the cross-sectional width of each channel of the first set of channels at a first radial location from the axial centerline of the heat exchanger is greater than the width of each channel of the second set of channels at the same radial location from the axial centerline of the heat exchanger.

4. The heat exchanger of claim 1,
wherein each fin of the first set of fins includes a helical shape; and
wherein each fin of the second set of fins matches the helical shape of each fin of the first set of fins.

5. The heat exchanger of claim 1, wherein the channels of the first and second sets of channels extend radially outward relative to the axial centerline of the heat exchanger.

6. The heat exchanger of claim 1, wherein a ratio of a cross-sectional area of a channel of the first set of channels to a cross-sectional area of a channel of the second set of channels, measured at a same radial distance from the axial centerline, is uniform at all radial distances from the axial centerline along the radial direction of the heat exchanger.

7. The heat exchanger of claim 1, wherein the first and second sets of fins are integrally formed with the exterior wall via layer-by-layer additive manufacturing.

8. The heat exchanger of claim 1, wherein the first and second sets of channels are fluidly separated from one another and are configured to transfer heat from a first fluid flowing through the first set of channels to a second fluid flowing through the second set of channels.

9. A method of manufacturing a heat exchanger, the method comprising:
forming a first and a second set of fins, wherein:
the first set of fins that extend radially and that are coaxial with each other, wherein the first set of fins forms a first set of channels;
a second set of fins that extend radially and that are coaxial with each other, wherein:
the second set of fins and the first set of fins form an alternating pattern in a circumferential direction such that each fin of the first set of fins is positioned between two fins of the second set of fins and each fin of the second set of fins is positioned between two fins of the first set of fins; and
the second set of fins forms a second set of channels, wherein channels of the first and second sets of channels are disposed in an alternating pattern in a circumferential direction, wherein the first and second sets of fins are integrally formed together, and wherein a cross-sectional width of a channel of at least one of the first set of channels and the second set of channels increases as a radial distance from a centerline axis of the heat exchanger increases; and forming a curved exterior wall, wherein the curved exterior wall is integrally formed to the first and second sets of fins, wherein the first and second sets of fins are contained within the exterior wall;
forming a first inlet header and a first outlet header, wherein the first inlet header is fluidly connected to and disposed on an upstream end of the first set of fins, and wherein the first outlet header is fluidly connected to and disposed on a downstream end of the first set of fins;
forming a second inlet header and a second outlet header, wherein the second inlet header is fluidly connected to and disposed on an upstream end of the second set of fins, and wherein the second outlet header is fluidly connected to and disposed on a downstream end of the second set of fins; and
a third inlet header and a third outlet header, wherein the third inlet header is fluidly connected to and disposed on an upstream end of a chamber, and wherein the third outlet header is fluidly connected to and disposed on a downstream end of the chamber.

10. The method of claim 9, further comprising:
forming each channel of the first set of channels to comprise a tapered shape that increases in width along a radially outward direction;
forming each channel of the second set of channels to comprise a tapered shape that increases in width along the radially outward direction; and
wherein a ratio between a width of a channel of the first set of channels and a width of a channel of the second set of channels remains approximately constant across a first radial region of the first and second sets of channels.

11. The method of claim 9, wherein the cross-sectional width of each channel of the first set of channels at a first radial location from the axial centerline of the heat exchanger is greater than the width of each channel of the second set of channels at the same radial location from the axial centerline of the heat exchanger.

12. The method of claim 9,
wherein each fin of the first set of fins includes a helical shape; and
wherein each fin of the second set of fins matches the helical shape of each fin of the first set of fins.

13. The method of claim 9, wherein the channels of the first and second sets of channels extend radially outward relative to the axial centerline of the heat exchanger.

14. The method of claim 9, wherein a ratio of a cross-sectional area of a channel of the first set of channels to a cross-sectional area of a channel of the second set of channels, measured at a same radial distance from the axial centerline, is uniform at all radial distances from the axial centerline along the radial direction of the heat exchanger.

* * * * *